United States Patent
Koga et al.

(10) Patent No.: US 11,219,868 B2
(45) Date of Patent: Jan. 11, 2022

(54) DEVICE FOR CLEANING AND METHOD FOR CLEANING WATER TREATMENT MEMBRANE, AND WATER TREATMENT SYSTEM

(71) Applicant: Mitsubishi Electric Corporation, Tokyo (JP)

(72) Inventors: Hiromichi Koga, Tokyo (JP); Koichi Tokimori, Tokyo (JP); Shinsuke Goto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 52 days.

(21) Appl. No.: 16/616,890

(22) PCT Filed: Jun. 7, 2017

(86) PCT No.: PCT/JP2017/021135
§ 371 (c)(1),
(2) Date: Nov. 25, 2019

(87) PCT Pub. No.: WO2018/225186
PCT Pub. Date: Dec. 13, 2018

(65) Prior Publication Data
US 2021/0170340 A1  Jun. 10, 2021

(51) Int. Cl.
*B01D 65/02*    (2006.01)
*C02F 1/78*     (2006.01)
(Continued)

(52) U.S. Cl.
CPC .......... *B01D 65/02* (2013.01); *C02F 1/44* (2013.01); *C02F 1/78* (2013.01); *B01D 2321/04* (2013.01);
(Continued)

(58) Field of Classification Search
CPC ............ B01D 65/02; B01D 2321/04; B01D 2321/185; C02F 1/78; C02F 2201/782
See application file for complete search history.

(56) References Cited

U.S. PATENT DOCUMENTS 5,607,593 A * 3/1997 Cote .................. B01D 61/147
                                                         210/195.2

FOREIGN PATENT DOCUMENTS

| JP | H0664904 U   | 3/1994 |
| JP | 2001070761 A | 3/2001 |

(Continued)

OTHER PUBLICATIONS

Office Action dated Nov. 23, 2020, issued in corresponding Korean Patent Application No. 10-2019-7034718, 13 pages including 7 pages of English translation.

(Continued)

*Primary Examiner* — Bradley R Spies
(74) *Attorney, Agent, or Firm* — Buchanan Ingersoll & Rooney PC

(57) ABSTRACT

A cleaning device includes: an ozone gas supply portion; an ozone dissolution tank including a gas phase portion in which ozone gas is to be accumulated and a liquid phase portion formed by water in which the ozone gas is to be dissolved; a gas phase portion ozone gas supply pipe for supplying ozone gas from the ozone gas supply portion to the gas phase portion; a liquid phase portion ozone gas supply pipe for supplying ozone gas from the ozone gas supply portion to the liquid phase portion; and an ozone water supply pipe for supplying ozone water generated in the ozone dissolution tank to a filtering secondary side, wherein the ozone water is supplied to the filtering secondary side by the pressure of ozone gas in the gas phase portion.

6 Claims, 4 Drawing Sheets

(51) Int. Cl.
*C02F 1/44* (2006.01)
*C02F 101/30* (2006.01)

(52) U.S. Cl.
CPC .. *B01D 2321/168* (2013.01); *B01D 2321/185* (2013.01); *C02F 2101/30* (2013.01); *C02F 2201/782* (2013.01); *C02F 2303/16* (2013.01)

(56) References Cited

FOREIGN PATENT DOCUMENTS

| | | | |
|---|---|---|---|
| JP | 2001079365 | A | 3/2001 |
| JP | 2002292257 | A | 10/2002 |
| JP | 2004344833 | A | 12/2004 |
| JP | 2010199124 | A | 9/2010 |
| JP | 2012096209 | A | 5/2012 |

OTHER PUBLICATIONS

International Search Report (with English Translation) and Written Opinion issued in corresponding International Patent Application No. PCT/JP2017/021135, 11 pages (dated Jul. 18, 2017).
Office Action dated Sep. 2, 2020, issued in corresponding Indian Patent Application No. 201927045963, 5 pages.
Chinese Office Action dated Aug. 3, 2021 in corresponding Chinese Patent Application No. 201780091540.7. 17 pages with English translation.

* cited by examiner

DEVICE FOR CLEANING AND METHOD FOR CLEANING WATER TREATMENT MEMBRANE, AND WATER TREATMENT SYSTEM

TECHNICAL FIELD

The present invention relates to a cleaning device and a cleaning method for a water treatment membrane through which organic substances contained in waste water or the like are subjected to membrane separation, and a water treatment system.

BACKGROUND ART

One example of methods for removing organic substances from service water, sewage, waste water such as industrial waste water, or the like containing organic substances is membrane separation using a water treatment membrane. In such a water treatment system, raw water such as waste water is filtered by a water treatment membrane so that the raw water is separated into organic substances and filtered water. Thus, removal of organic substances can be stably performed. However, as the treatment is performed successively, organic substances are adhered to the inside and the surface of the water treatment membrane, so that pores formed in the water treatment membrane may be clogged. When the pores of the water treatment membrane are clogged, the transmembrane pressure increases or the amount of filtered water is reduced, so that the treatment capacity decreases. Therefore, it is necessary to regularly clean the inside and the surface of the water treatment membrane, to remove organic substances. As a method for cleaning the water treatment membrane, reverse cleaning is generally performed in which cleaning liquid is caused to flow from the filtering secondary side (filtered water side) to the filtering primary side (raw water side) of the water treatment membrane, thereby cleaning the inside and the membrane surface of the water treatment membrane. Various cleaning liquids are used for the reverse cleaning, for example, water or an oxidizing agent aqueous solution such as sodium hypochlorite aqueous solution is used. In order to obtain a higher cleaning effect, ozone water having high oxidizing power may be used.

In the case of using ozone water as a cleaning liquid, even if ozone water in which ozone is dissolved to an extent close to saturation solubility is attempted to be used in order to obtain a sufficient cleaning effect, the dissolved ozone might be isolated due to a negative pressure that occurs partially inside a pump for pressure-feeding the ozone water. Thus, there is a possibility that the ozone concentration in the cleaning liquid decreases and a sufficient cleaning effect is not obtained. In addition, in the case of using a general centrifugal pump, there is a possibility that the performance of the pump is reduced due to cavitation occurring in the pump or the pump becomes unable to operate due to sucking of the isolated ozone gas.

Accordingly, proposed is a cleaning method in which air bubbling is performed for introducing bubbles of ozone gas or the like to the raw water side, at the same time as reverse cleaning using ozone containing water, in order to enhance the cleaning effect (see, for example, Patent Document 1).

In another method, cleaning gas such as ozone gas generated by a gas generator is mixed with a fluid such as water by an ejector (Venturi-type gas-liquid mixing device), to generate a cleaning fluid, and the cleaning fluid is introduced into a water cleaning tank provided with a water treatment membrane (hollow fiber filter), not via a pump (see, for example, Patent Document 2).

In still another method, by a uniaxial eccentric screw pump, water in which bubbles of ozone gas are suspended is pushed and introduced into a pressure ozone dissolution tank that also serves as an accumulator (see, for example, Patent Document 3).

CITATION LIST

Patent Document

Patent Document 1: Japanese Laid-Open Patent Publication No. 2001-79365 (paragraph [0006] of the specification, FIG. 1)
Patent Document 2: Japanese Laid-Open Patent Publication No. 2012-96209 (paragraphs [0022] to [0027] of the specification, FIG. 1 to FIG. 5)
Patent Document 3: Japanese Laid-Open Patent Publication No. 06-64904 (paragraphs [0014] and [0015] of the specification, FIG. 1)

SUMMARY OF THE INVENTION

Problems to be Solved by the Invention

However, for the method described in Patent Document 1, it is necessary to separately provide a compressor for air bubbling, and the like, resulting in a complicated structure and increase in cost.

In the method described in Patent Document 2, reverse cleaning for the water treatment membrane is performed using the cleaning fluid containing bubbles of ozone gas or the like. Therefore, gas such as ozone gas enters the inside of the pores of the water treatment membrane and the inside of the pores is dried, so that filtering performance of the water treatment membrane might be reduced. It is conceivable that a gas-liquid separation device is provided between the ejector and the water treatment membrane, but in this case, the size of the entire apparatus is enlarged.

In the method described in Patent Document 3, undissolved ozone gas is discharged to the outside air so as to keep the set pressure of the pressure ozone dissolution tank constant. Therefore, the ozone gas is partially wasted, so that the usage efficiency of the ozone gas is decreased, and in addition, an ozone treatment device such as a reducing device is needed, leading to size increase in the entire apparatus.

The present invention has been made to solve the above problems, and an object of the present invention is to provide a cleaning device and a cleaning method for a water treatment membrane, and a water treatment system, that achieve high usage efficiency of ozone gas with a simple configuration without size increase.

Solution to the Problems

One aspect of the present invention is directed to a water treatment membrane cleaning device for a water treatment membrane for filtering and treating raw water that is a treatment target, the cleaning device being configured to cause ozone water to flow from a filtering secondary side to a filtering primary side so as to clean the water treatment membrane, the cleaning device including: an ozone gas supply portion for generating and supplying ozone gas; an ozone dissolution tank including a gas phase portion in which the ozone gas is to be accumulated and a liquid phase portion formed by water in which the ozone gas is to be dissolved, the ozone dissolution tank being configured to generate ozone water by dissolving the ozone gas supplied from the ozone gas supply portion, into the water forming the liquid phase portion; first ozone gas supply means for supplying the ozone gas from the ozone gas supply portion to the gas phase portion; second ozone gas supply means for supplying the ozone gas from the ozone gas supply portion to the liquid phase portion; ozone water supply means for supplying the ozone water generated in the ozone dissolution tank, to the filtering secondary side; and third ozone gas supply means for supplying, to the filtering primary side, undissolved ozone gas which is accumulated in the gas phase portion without being dissolved in the water forming the liquid phase portion, wherein after the undissolved ozone gas is supplied to the filtering primary side and a surface of the water treatment membrane is cleaned, the ozone water is supplied to the filtering secondary side by a pressure of the ozone gas in the gas phase portion.

Another aspect of the present invention is directed to a water treatment membrane cleaning method for a water treatment membrane for filtering and treating raw water that is a treatment target, the cleaning method causing ozone water to flow from a filtering secondary side to a filtering primary side so as to clean the water treatment membrane, the cleaning method including: an ozone water generation step of, while accumulating undissolved ozone gas in a gas phase portion of an ozone dissolution tank for generating ozone water, supplying ozone gas to a liquid phase portion of the ozone dissolution tank, and dissolving the ozone gas into water forming the liquid phase portion, to generate ozone water, and supplying the undissolved ozone gas to the filtering primary side, to clean a surface of the water treatment membrane; and an ozone water supply step of supplying ozone gas to the gas phase portion, and supplying the ozone water generated in the ozone water generation step to the filtering secondary side by a pressure of the ozone gas in the gas phase portion, so as to clean the water treatment membrane.

Effect of the Invention

The present invention can provide a cleaning device and a cleaning method for a water treatment membrane, and a water treatment system, that achieve high usage efficiency of ozone gas with a simple configuration without size increase.

DESCRIPTION OF EMBODIMENTS

Embodiment 1

Figure 1:
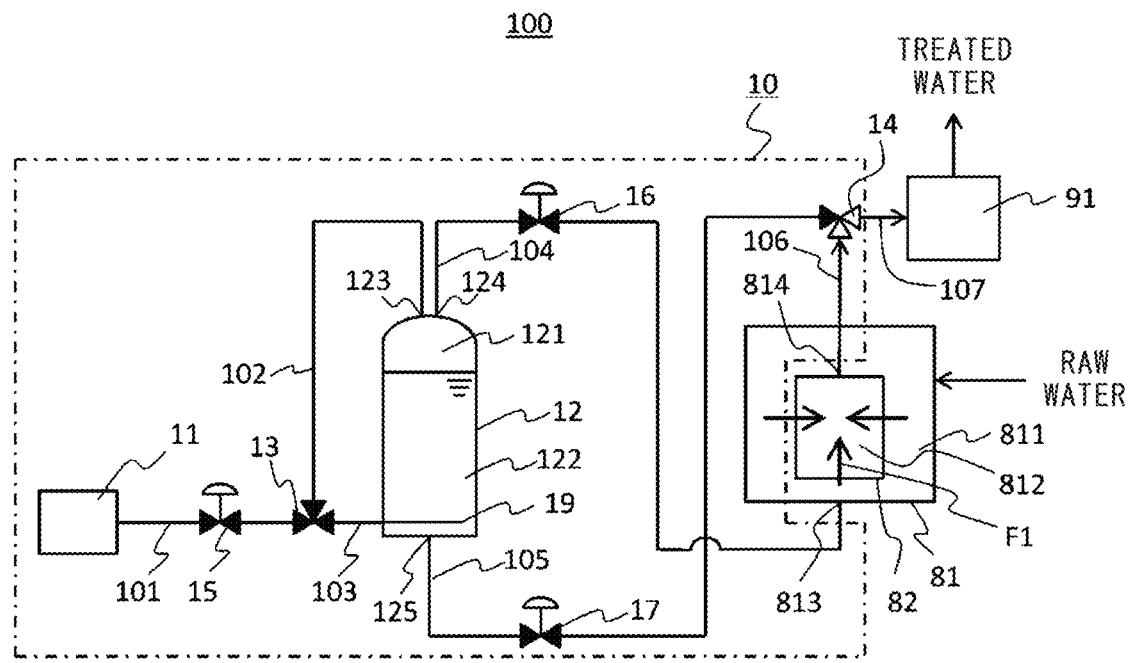
FIG. 1 is a diagram schematically showing the entire configuration of a water treatment system according to embodiment 1 of the present invention.

Hereinafter, embodiment 1 of the present invention will be described with reference to FIG. 1 to FIG. 6. FIG. 1 is a diagram schematically showing the entire configuration of a water treatment system according to embodiment 1. FIG. 1 shows the state of the water treatment system in a processing step in which raw water is treated. A water treatment system 100 includes: a membrane separation tank 81 having therein a separation membrane 82, i.e., water treatment membrane, for separating organic substances from raw water which is service water, sewage, industrial waste water, or the like containing organic substances, to perform water treatment, the membrane separation tank 81 being configured such that the outer side of the separation membrane 82 is a filtering primary side 811 and the inner side of the separation membrane 82 is a filtering secondary side 812; a cleaning device 10 for cleaning the separation membrane 82, i.e., a cleaning device for a water treatment membrane; and a treated water tank 91 for temporarily storing raw water treated in the membrane separation tank 81, as treated water.

The cleaning device 10 for the water treatment membrane includes an ozone gas supply portion 11, and an ozone dissolution tank 12 for generating ozone water. The ozone gas supply portion 11 is composed of a source gas supply portion (not shown) and an ozone gas generation portion (not shown) for generating ozone gas using, as a source material, oxygen supplied from the source gas supply portion. The source gas generation portion is, for example, an oxygen generation device using a liquid oxygen cylinder, vacuum pressure swing adsorption (VPSA), or the like. However, the source gas generation portion is not particularly limited as long as the source gas generation portion is a device or the like that can supply oxygen. The ozone gas generation portion may be a discharge-type ozone generation device, for example.

One end of an ozone gas supply pipe 101 is connected to the ozone gas supply portion 11. The other end of the ozone gas supply pipe 101 is connected to an ozone gas flow path switch valve 13, i.e., ozone gas flow path switch means. The ozone gas flow path switch valve 13 is connected to a gas phase portion ozone gas supply pipe 102, i.e., first ozone gas supply means, and a liquid phase portion ozone gas supply pipe 103, i.e., second ozone gas supply means. The ozone gas flow path switch valve 13 performs open/close operation through control by a control device (not shown), to switch the supply destination of ozone gas supplied from the ozone gas supply pipe 101, between the gas phase portion ozone gas supply pipe 102 and the liquid phase portion ozone gas supply pipe 103.

The ozone dissolution tank 12 has a gas phase portion 121 and a liquid phase portion 122 formed therein. The liquid phase portion 122 is an area occupied by liquid, and in embodiment 1, water is used as the liquid forming the liquid phase portion 122. In the liquid phase portion 122, a diffuser device 19 is provided which is connected to the liquid phase portion ozone gas supply pipe 103 and blows ozone gas supplied from the ozone gas supply portion 11, into the water forming the liquid phase portion 122. The gas phase portion 121 is formed above the liquid phase portion 122, and serves as a space in which ozone gas is accumulated as described later. The top part of the ozone dissolution tank 12 is provided with an ozone gas inflow port 123 to which the gas phase portion ozone gas supply pipe 102 is connected, and an ozone gas outflow port 124 to which a membrane separation tank ozone gas supply pipe 104, i.e., third ozone gas supply means is connected. The bottom part of the ozone dissolution tank 12 is provided with an ozone water outflow port 125 to which an ozone water supply pipe 105, i.e., ozone water supply means is connected.

In embodiment 1, the ozone gas inflow port 123 and the ozone gas outflow port 124 are provided at the top part of the ozone dissolution tank 12, but the ozone gas inflow port 123 and the ozone gas outflow port 124 may be provided at such positions that allow the gas phase portion 121 to communicate with the gas phase portion ozone gas supply pipe 102 and the membrane separation tank ozone gas supply pipe 104. In addition, although the ozone water outflow port 125 is provided at the bottom part of the ozone dissolution tank 12, the ozone water outflow port 125 may be provided at such a position that allows the ozone water supply pipe 105 and the liquid phase portion 122 to communicate with each other.

The ozone gas supply pipe 101 is provided with an ozone gas supply pressure adjustment valve 15 which performs open/close operation through control by the control device (not shown), to control flow of ozone gas between the ozone gas supply portion 11 and the ozone gas flow path switch valve 13 and adjust the pressure of the ozone gas to be supplied to the secondary side (ozone gas flow path switch valve 13 side) as seen from the ozone gas supply portion 11. The membrane separation tank ozone gas supply pipe 104 is connected to the filtering primary side 811 of the membrane separation tank 81. The membrane separation tank ozone gas supply pipe 104 is provided with an ozone dissolution tank pressure adjustment valve 16 which performs open/close operation through control by the control device (not shown), to control flow of ozone gas flowing through the membrane separation tank ozone gas supply pipe 104 and adjust the pressure of the gas phase portion 121 in the ozone dissolution tank 12. The ozone water supply pipe 105 is connected to the filtering secondary side 812 of the membrane separation tank 81 via a three-way valve 14 and a filtering secondary side flow path pipe 106. The ozone water supply pipe 105 is provided with an ozone water supply pressure adjustment valve 17 which performs open/close operation through control by the control device (not shown), to control flow of ozone water flowing through the ozone water supply pipe 105 and adjust the supply pressure of the ozone water from the liquid phase portion 122.

In the membrane separation tank 81, the separation membrane 82 is an organic hollow fiber membrane made from an ozone-resistant material such as polyvinylidene fluoride (PVDF) or polytetrafluoroethylene (PTFE), for example. The filtering primary side 811 of the membrane separation tank 81 is the entrance side for the raw water to be treated, and the filtering secondary side 812 thereof is the exit side for the raw water filtered by the separation membrane 82. The filtering primary side 811 is connected to the membrane separation tank ozone gas supply pipe 104 via a filtering primary side connection portion 813. The filtering secondary side 812 is connected to the filtering secondary side flow path pipe 106 via a filtering secondary side connection portion 814.

The treated water tank 91 is connected to the filtering secondary side 812 via the filtering secondary side flow path pipe 106, the three-way valve 14, and a treated water transfer pipe 107. The three-way valve 14 performs open/close operation through control by the control device (not shown), to control flow of fluid among the ozone water supply pipe 105, the filtering secondary side flow path pipe 106, and the treated water transfer pipe 107.

Regarding the ozone gas flow path switch valve 13, the three-way valve 14, the ozone gas supply pressure adjustment valve 15, the ozone dissolution tank pressure adjustment valve 16, and the ozone water supply pressure adjustment valve 17, an outlined part in the drawing indicates an opened state or a state in which the part is openable in accordance with the pressure, and a filled part in the drawing indicates a closed state. That is, in FIG. 1, the ozone gas flow path switch valve 13 is in a closed state in all directions, the three-way valve 14 is in an opened state between the filtering secondary side flow path pipe 106 and the treated water transfer pipe 107 and forms a flow path therebetween, and is in a closed state for the ozone water supply pipe 105 side. In addition, the ozone gas supply pressure adjustment valve 15, the ozone dissolution tank pressure adjustment valve 16, and the ozone water supply pressure adjustment valve 17 are in a closed state.

Figure 2:
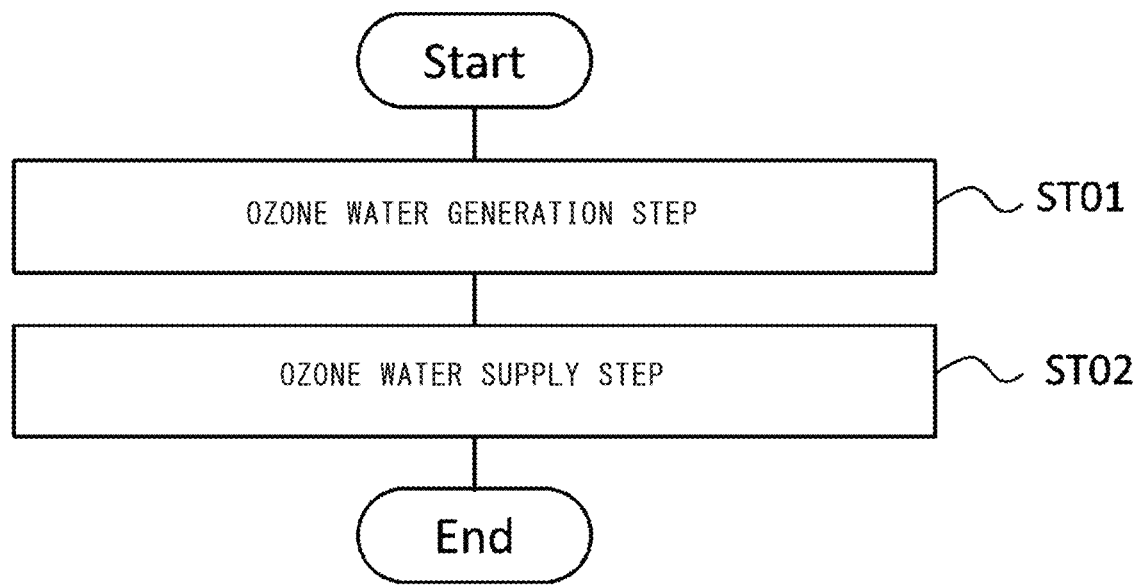
FIG. 2 is a flowchart showing a cleaning method for a water treatment membrane according to embodiment 1 of the present invention.

Next, operation will be described. In a step for treating raw water, as shown in FIG. 1, the raw water is introduced into the membrane separation tank 81, and inside the membrane separation tank 81, flow F1 of the raw water flowing from the filtering primary side 811 into the filtering secondary side 812 occurs. The raw water flowing into the filtering secondary side 812 is filtered by the separation membrane 82 so that organic substances are removed therefrom, and then the filtered water is sent from the filtering secondary side 812 through the filtering secondary side flow path pipe 106, the three-way valve 14, and the treated water transfer pipe 107 to the treated water tank 91. The treated water sent to the treated water tank 91 is temporarily stored therein, and then discharged to the outside of the system. During the step for treating the raw water, since the ozone dissolution tank pressure adjustment valve 16 and the ozone water supply pressure adjustment valve 17 are in a closed state, flow is interrupted between the membrane separation tank 81 and the cleaning device 10. After the step for treating the raw water, cleaning for the separation membrane 82 is performed. FIG. 2 is a flowchart showing a cleaning method for the water treatment membrane according to embodiment 1. The cleaning method for the water treatment membrane in the present invention includes two steps, i.e., an ozone water generation step (step ST01), and an ozone water supply step (step ST02) subsequent to the ozone water generation step. Each step will be described below.

Figure 3:
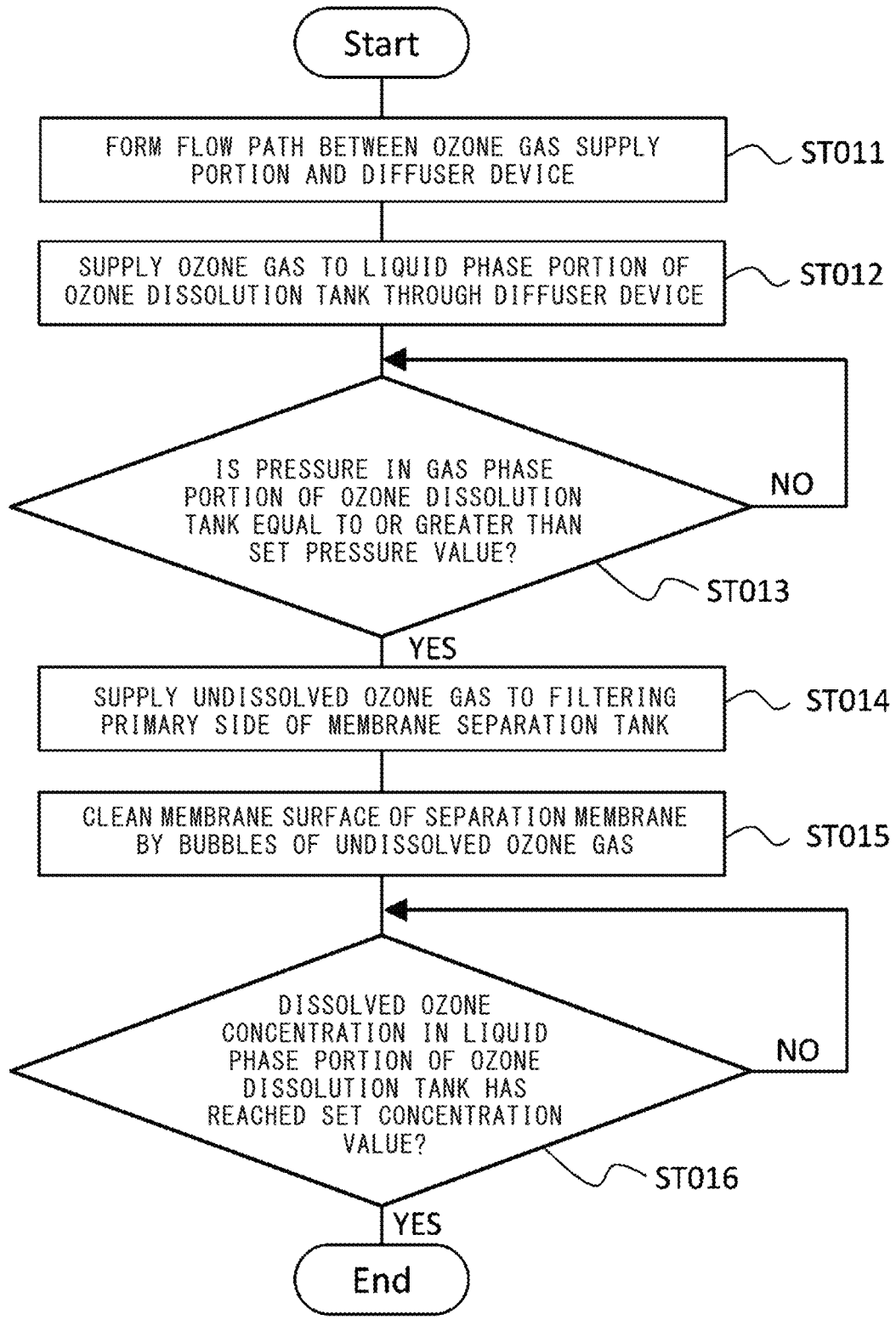
FIG. 3 is a flowchart showing an ozone water generation step according to embodiment 1 of the present invention.
Figure 4:
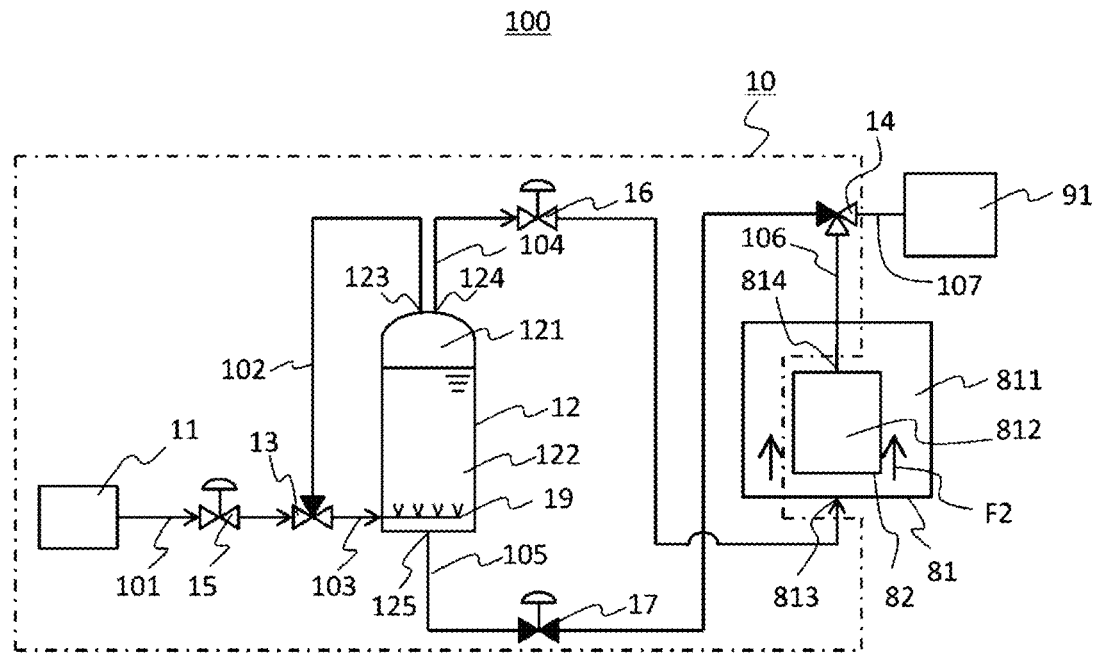
FIG. 4 is a diagram schematically showing the entire configuration of the water treatment system in the ozone water generation step according to embodiment 1 of the present invention.

FIG. 3 is a flowchart showing the ozone water generation step according to embodiment 1, and FIG. 4 is a diagram schematically showing the entire configuration of the water treatment system in the ozone water generation step according to embodiment 1. In the ozone water generation step, first, the ozone gas flow path switch valve 13 is opened between the ozone gas supply pipe 101 and the liquid phase portion ozone gas supply pipe 103, to form a flow path between the ozone gas supply portion 11 and the diffuser device 19 (step ST011). The ozone gas flow path switch valve 13 is closed for the gas phase portion ozone gas supply pipe 102 side, to interrupt flow between the ozone gas supply portion 11 and the gas phase portion 121. In addition, the ozone water supply pressure adjustment valve 17 is closed. The opened/closed state of the ozone dissolution tank pressure adjustment valve 16 is controlled by the pressure of the gas phase portion 121 as described later.

Next, the ozone gas supply portion 11 is activated to send ozone gas to the diffuser device 19, and the ozone gas is supplied to the liquid phase portion 122 through the diffuser device 19 (step ST012). At this time, the set pressure value of the ozone gas supply pressure adjustment valve 15 is equal to or greater than the value of the hydraulic head pressure applied to the diffuser device 19. The set pressure value of the ozone dissolution tank pressure adjustment valve 16 is smaller than a pressure value obtained by subtracting the value of the hydraulic head pressure applied to the diffuser device 19, from the set pressure value of the ozone gas supply pressure adjustment valve 15. Setting the pressure value for the ozone dissolution tank pressure adjustment valve 16 as described above allows the ozone gas to be continuously supplied into the liquid phase portion 122 from the diffuser device 19.

The ozone gas supplied to the liquid phase portion 122 is partially dissolved in the water in the liquid phase portion 122, and the rest of the ozone gas is accumulated in the gas phase portion 121 as undissolved ozone gas. The undissolved ozone gas accumulated in the gas phase portion 121 increases the pressure of the ozone gas in the gas phase portion 121. According to the Henry's law, the saturation solubility of gas to water increases as the pressure of the gas increases. Therefore, the saturation solubility of ozone to water forming the liquid phase portion 122 increases with accumulation of the undissolved ozone gas in the gas phase portion 121.

When the pressure value of the gas phase portion 121 has become equal to or greater than the set pressure value of the ozone dissolution tank pressure adjustment valve 16 (step ST013), a part of the undissolved ozone gas flows out from the ozone gas outflow port 124 and is supplied to the filtering primary side 811 of the membrane separation tank 81 via the membrane separation tank ozone gas supply pipe 104 (step ST014).

The undissolved ozone gas supplied to the filtering primary side 811 becomes bubbles in the filtering primary side 811, and flows in the filtering primary side 811 as indicated by flow F2 of the undissolved ozone gas shown in FIG. 4. The bubbles of the undissolved ozone gas flowing in the filtering primary side 811 peels and removes organic substances adhered to the membrane surface of the separation membrane 82 by a physical action due to shearing force and a chemical action of the ozone gas as an oxidizing gas, thereby cleaning the membrane surface of the separation membrane 82 (step ST015). Also for adhered materials that cannot be peeled/removed by the bubbles of the undissolved ozone gas alone, an effect of weakening the strength of adhesion to the separation membrane 82 is exerted. In this way, the undissolved ozone gas supplied to the filtering primary side 811 acts as an aeration gas for cleaning the membrane surface. Thus, the undissolved ozone gas is consumed in the membrane separation tank, and contamination of the separation membrane 82 is reduced.

When the dissolved ozone concentration in the water forming the liquid phase portion 122 reaches a set concentration value and thus ozone water having a desired dissolved ozone concentration is generated in the liquid phase portion 122, the ozone water generation step is finished, to proceed to the next step, i.e., the ozone water supply step (step ST016). It is noted that the set concentration value is a predetermined value close to the saturation solubility. The higher the dissolved ozone concentration is, the higher the cleaning effect for the separation membrane 82 is. Therefore, it is preferable that the set concentration value is as close to the saturation solubility as possible. However, the saturation solubility varies depending on the temperature, pH, and the pressure of the solvent. Therefore, in order to make the dissolved ozone concentration constant for every cleaning, the set concentration value may be a constant value equal to or greater than 30 mg/L, for example. Alternatively, an air diffusion period required for the dissolved ozone concentration to reach the set concentration value may be calculated in advance, and in the actual ozone water generation step, the air diffusion period may be set instead of the set concentration value.

Figure 5:
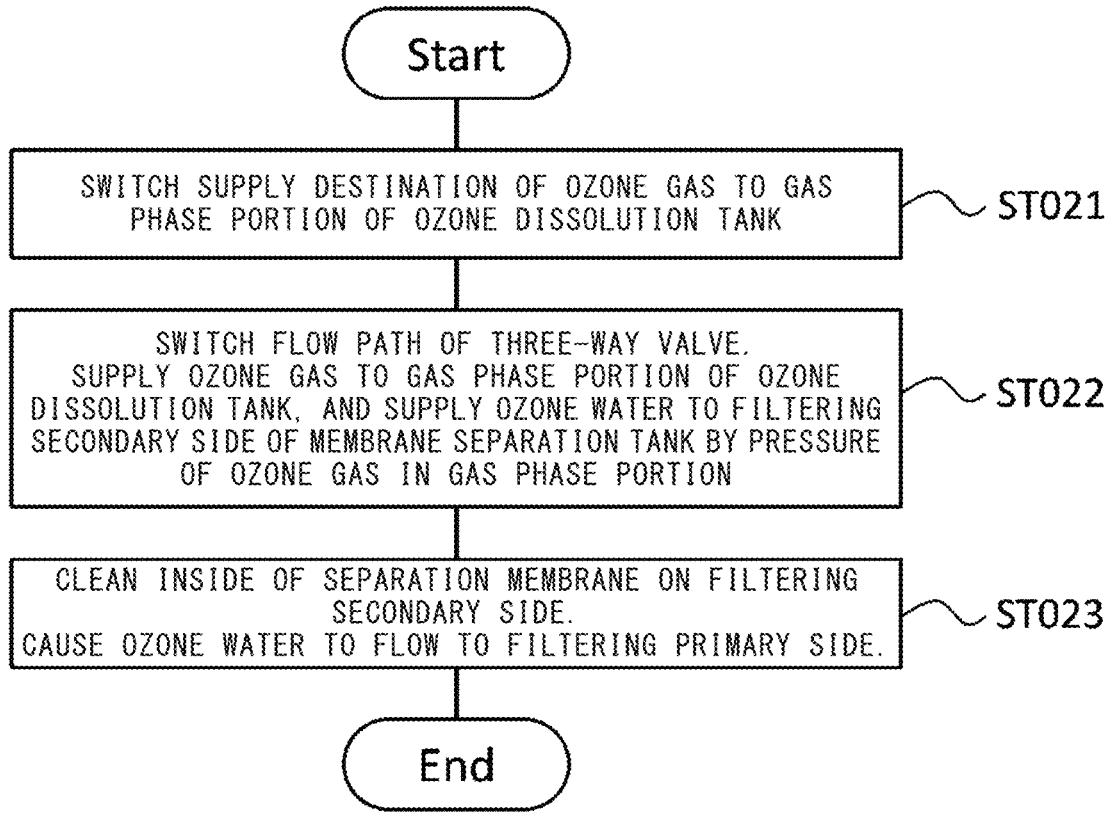
FIG. 5 is a flowchart showing an ozone water supply step according to embodiment 1 of the present invention.
Figure 6:
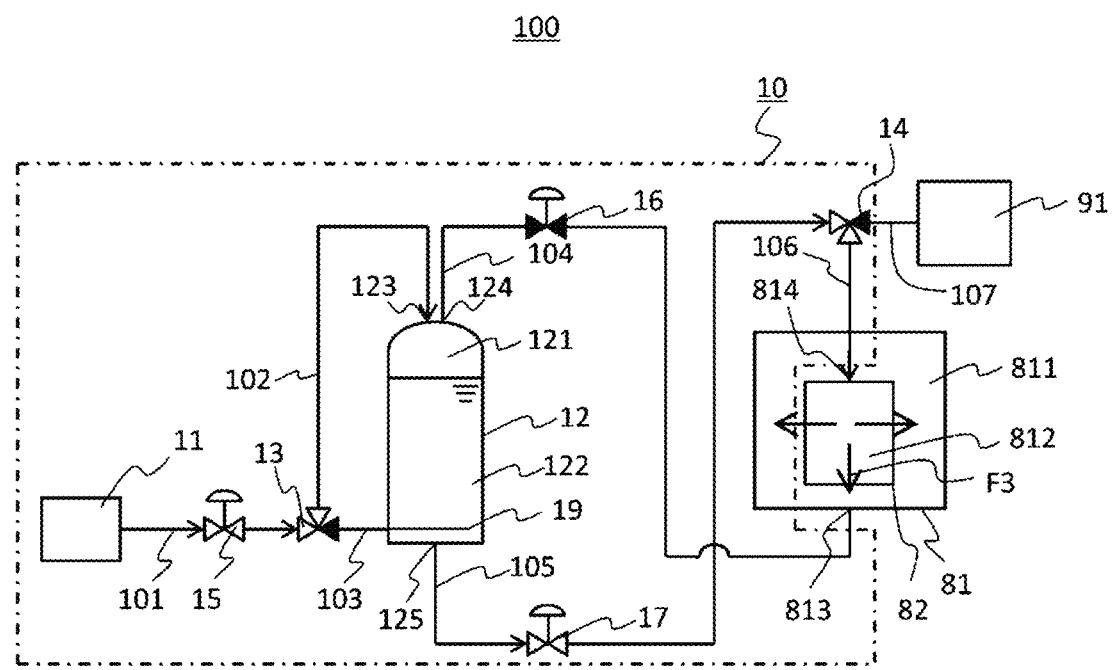
FIG. 6 is a diagram schematically showing the entire configuration of the water treatment system in the ozone water supply step according to embodiment 1 of the present invention.

FIG. 5 is a flowchart showing the ozone water supply step according to embodiment 1, and FIG. 6 is a diagram schematically showing the entire configuration of the water treatment system in the ozone water supply step according to embodiment 1. In the ozone water supply step, first, the ozone gas flow path switch valve 13 is opened between the ozone gas supply pipe 101 and the gas phase portion ozone gas supply pipe 102, to form a flow path between the ozone gas supply portion 11 and the gas phase portion 121, and is closed for the liquid phase portion ozone gas supply pipe 103 side, thereby switching the supply destination of the ozone gas from the liquid phase portion 122 to the gas phase portion 121 (step ST021). In addition, the ozone dissolution tank pressure adjustment valve 16 is closed. The opened/closed state of the ozone water supply pressure adjustment valve 17 is controlled by the supply pressure of the ozone water as described later.

Next, the three-way valve 14 is opened between the ozone water supply pipe 105 and the filtering secondary side flow path pipe 106, to form a flow path between the liquid phase portion 122 and the filtering secondary side, and is closed for the treated water transfer pipe 107 side, thereby switching the flow path of the three-way valve 14. Thereafter, ozone gas is supplied to the gas phase portion 121 through the ozone gas inflow port 123, and the ozone water in the liquid phase portion 122 is transferred using the pressure of the ozone gas in the gas phase portion 121 as a drive force, so as to be supplied to the filtering secondary side 812 of the membrane separation tank 81 (step ST022). Since the ozone dissolution tank pressure adjustment valve 16 is in a closed state, the pressure in the gas phase portion 121 increases with supply of the ozone gas to the gas phase portion 121, whereby a sufficient pressure for transferring the ozone water to the filtering secondary side 812 can be obtained. The ozone water in the liquid phase portion 122 flows out through the ozone water outflow port 125, passes through the ozone water supply pipe 105, the three-way valve 14, and the filtering secondary side flow path pipe 106, and flows into the filtering secondary side 812.

As described above, while the ozone water is supplied to the filtering secondary side 812, impurities such as organic suspended substances clogged inside the membrane are dissolved in the filtering secondary side 812, whereby the inside of the separation membrane 82 is cleaned. The ozone water after used for the cleaning flows from the filtering secondary side to the filtering primary side 811 as indicated by flow F3 of the ozone water shown in FIG. 6 (step ST023).

The drive force for causing the ozone water to flow from the filtering secondary side 812 to the filtering primary side 811 is based on a pressure from the gas phase portion 121, as in the transfer of the ozone water. From the standpoint of the cleaning effect for the separation membrane 82 or preventing ozone from being isolated again in the ozone water during the transfer, it is preferable that the ozone water is supplied to the filtering secondary side 812 with a supply pressure as high as possible. However, if a pressure applied to the separation membrane 82 due to flow of the ozone water is excessively high, there is a possibility that the pressure exceeds the withstand pressure of the separation membrane 82 and thus the separation membrane 82 is damaged. The ozone water supply pressure adjustment valve 17 is controlled so as to reduce such an excessive supply pressure, and thus the pressure of the ozone water supplied to the filtering secondary side 812 is adjusted, whereby the pressure applied to the separation membrane 82 due to flow of the ozone water is prevented from becoming excessively high. In consideration of balance between the cleaning effect of the ozone water, etc. and prevention of damage of the separation membrane, it is preferable that the set pressure value of the ozone water supply pressure adjustment valve 17 is not less than the set pressure value of the ozone dissolution tank pressure adjustment valve 16 and not greater than 300 kPa.

The time required for cleaning the separation membrane 82, which depends on the size or the contamination degree of the separation membrane 82, is conceivably about 30 minutes. During cleaning, supply of the ozone gas from the ozone gas supply portion 11 to the gas phase portion 121 is continued and supply of the ozone water to the filtering secondary side 812 is continued, and thereafter, the supply of the ozone gas from the ozone gas supply portion 11 is stopped and thus the ozone water supply step is finished.

According to embodiment 1, the usage efficiency of ozone gas can be enhanced with a simple configuration without size increase. More specifically, the gas phase portion ozone gas supply pipe and the liquid phase portion ozone gas supply pipe are provided so that ozone gas can be supplied to each of the gas phase portion and the liquid phase portion of the ozone dissolution tank for generating ozone water. With this configuration, after ozone is dissolved to the water in the liquid phase portion by the diffuser device, the supply destination of the ozone gas is switched so as to supply the ozone gas to the gas phase portion, and with the pressure of the ozone gas applied from the gas phase portion side, the ozone water is supplied to the membrane separation tank. Thus, the pressure applied to the ozone water is kept, and the ozone water can be transferred to the membrane separation tank while a high saturation solubility is maintained. Thus, the ozone is prevented from being isolated again, and the usage efficiency of the ozone gas is enhanced.

The cleaning for the separation membrane is performed with use of only ozone water, and a circulation path for increasing the dissolved ozone concentration is not needed. Therefore, the configuration is simplified and increase in cost can be prevented.

The ozone gas supplied to the gas phase portion and the undissolved ozone gas are used for increasing the pressure of the gas phase portion, and ozone in the ozone water used for the cleaning is consumed before the ozone water flows out to the filtering primary side. Therefore, a device for treating waste ozone gas, such as a reducing device using a catalyst, activated carbon, or the like, is not needed. Thus, size increase in the apparatus can be prevented, and increase in cost can be prevented.

Before cleaning for the separation membrane by the ozone water is performed in the ozone water supply step, the membrane surface of the separation membrane is cleaned from the filtering primary side, using bubbles of undissolved ozone gas in the ozone water generation step. Thus, the usage efficiency of ozone can be further enhanced. Further, since contamination of the separation membrane is reduced prior to the ozone water supply step, the supply pressure in the ozone water supply step can be reduced and the cleaning period can be shortened, whereby the amount of ozone gas required for the cleaning can be decreased. In addition, the undissolved ozone gas is consumed by being caused to react with sludge on the membrane surface or the filtering primary side. Therefore, it is not necessary to treat the undissolved ozone gas as waste ozone gas.

In embodiment 1, one ozone gas supply portion is provided and the supply destination of the ozone gas is switched by the ozone gas flow path switch valve, between the liquid phase portion and the gas phase portion of the ozone dissolution tank. However, since it is only required that the ozone gas can be supplied to both the gas phase portion and the liquid phase portion of the ozone dissolution tank, ozone gas supply portions may be respectively provided for the gas phase portion and the liquid phase portion. In this case, the ozone gas supply portion for the gas phase portion is connected to the gas phase portion ozone gas supply pipe and supplies ozone gas to only the gas phase portion, and the ozone gas supply portion for the liquid phase portion is connected to the liquid phase portion ozone gas supply pipe and supplies ozone gas to only the liquid phase portion. Therefore, the ozone gas flow path switch valve can be omitted.

It is noted that, within the scope of the present invention, the above embodiments may be freely combined with each other, or each of the above embodiments may be modified or simplified as appropriate.

DESCRIPTION OF THE REFERENCE CHARACTERS

10 cleaning device
11 ozone gas supply portion
12 ozone dissolution tank
13 ozone gas flow path switch valve
15 ozone gas supply pressure adjustment valve
16 ozone dissolution tank pressure adjustment valve
17 ozone water supply pressure adjustment valve
81 membrane separation tank
82 separation membrane
100 water treatment system
101 ozone gas supply pipe
102 gas phase portion ozone gas supply pipe
103 liquid phase portion ozone gas supply pipe
104 membrane separation tank ozone gas supply pipe
105 ozone water supply pipe
121 gas phase portion
122 liquid phase portion
811 filtering primary side
812 filtering secondary side

The invention claimed is:

1. A water treatment membrane cleaning device for a water treatment membrane for filtering and treating raw water that is a treatment target, the cleaning device including a controller configured to cause ozone water to flow from a filtering secondary side to a filtering primary side so as to clean the water treatment membrane, the cleaning device comprising:
   an ozone gas supply portion for generating and supplying ozone gas;
   an ozone dissolution tank including a gas phase portion in which the ozone gas is to be accumulated and a liquid phase portion formed by water in which the ozone gas is to be dissolved, the ozone dissolution tank being configured to generate ozone water by dissolving the ozone gas supplied from the ozone gas supply portion, into the water forming the liquid phase portion;
   a first ozone gas supplier for supplying the ozone gas from the ozone gas supply portion to the gas phase portion;
   a second ozone gas supplier for supplying the ozone gas from the ozone gas supply portion to the liquid phase portion;

an ozone water supplier for supplying the ozone water generated in the ozone dissolution tank, to the filtering secondary side; and a third ozone gas supplier for supplying, to the filtering primary side, undissolved ozone gas which is accumulated in the gas phase portion without being dissolved in the water forming the liquid phase portion, wherein after the undissolved ozone gas is supplied to the filtering primary side and a surface of the water treatment membrane is cleaned, the controller is configured to supply ozone gas from the ozone gas supply portion to the gas phase portion of the ozone dissolution tank to increase a pressure in the gas phase portion and ozone water is supplied to the filtering secondary side by a pressure of the ozone gas in the gas phase portion.

2. The water treatment membrane cleaning device according to claim 1, further comprising an ozone gas flow path switch for switching a supply destination of the ozone gas from the ozone gas supply portion, between the gas phase portion and the liquid phase portion.

3. A water treatment membrane cleaning method for a water treatment membrane for filtering and treating raw water that is a treatment target, the cleaning method causing ozone water to flow from a filtering secondary side to a filtering primary side so as to clean the water treatment membrane, the cleaning method comprising:

an ozone water generation step of, while accumulating undissolved ozone gas in a gas phase portion of an ozone dissolution tank for generating ozone water, supplying ozone gas to a liquid phase portion of the ozone dissolution tank, and dissolving the ozone gas into water forming the liquid phase portion, to generate ozone water, and supplying the undissolved ozone gas to the filtering primary side, to clean a surface of the water treatment membrane; and an ozone water supply step of supplying ozone gas to the gas phase portion to increase a pressure in the gas phase portion for supplying the ozone water generated in the ozone water generation step to the filtering secondary side by a pressure of the ozone gas in the gas phase portion, so as to clean the water treatment membrane.

4. A water treatment system comprising:

a membrane separation tank provided with a water treatment membrane for filtering raw water that is a treatment target; and the water treatment membrane cleaning device according to claim 1.

5. The water treatment membrane cleaning device according to claim 1, wherein the third ozone gas supplier is provided with an ozone dissolution tank pressure adjustment valve for supplying the undissolved ozone gas to the filtering primary side when a pressure value of the gas phase portion has become equal to or greater than a predetermined set pressure value.

6. The water treatment membrane cleaning method according to claim 3, wherein in the ozone water generation step, the undissolved ozone gas is supplied to the filtering primary side when a pressure value of the gas phase portion has become equal to or greater than a predetermined set pressure value.

* * * * *